US012559602B2

(12) United States Patent

Jung et al.

(10) Patent No.: US 12,559,602 B2

(45) Date of Patent: Feb. 24, 2026

(54) PLASTIC COMPOSITE WITH IMPROVED PHYSICAL PROPERTIES

(71) Applicant: KOLON SPACEWORKS CO., LTD., Haman-Gun Gyeongsangnam-Do (KR)

(72) Inventors: Woo Jin Jung, Gimpo-si (KR); Chang Hun Lee, Incheon (KR); Jae Du Nam, Goyang-si (KR); In Bee Oh, Seoul (KR)

(73) Assignee: KOLON SPACEWORKS CO., LTD., Haman-Gun Gyeongsangnam-Do (KR)

( * ) Notice: Subject to any disclaimer, the term of this patent is extended or adjusted under 35 U.S.C. 154(b) by 579 days.

(21) Appl. No.: 18/148,489

(22) Filed: Dec. 30, 2022

(65) Prior Publication Data

US 2024/0026108 A1     Jan. 25, 2024

(30) Foreign Application Priority Data

Jul. 22, 2022    (KR) ........................ 10-2022-0090847

(51) Int. Cl.
| | |
|---|---|
| *C08J 9/228* | (2006.01) |
| *B32B 5/02* | (2006.01) |
| *B32B 5/18* | (2006.01) |
| *C08J 5/08* | (2006.01) |
| *C08J 5/12* | (2006.01) |

(52) U.S. Cl.
CPC ................. *C08J 9/228* (2013.01); *B32B 5/02* (2013.01); *B32B 5/18* (2013.01); *C08J 5/08* (2013.01); *C08J 5/121* (2013.01); *B32B*
2305/10 (2013.01); *B32B 2305/22* (2013.01); *B32B 2307/546* (2013.01); *C08J 2375/04* (2013.01); *C08J 2433/12* (2013.01)

(58) Field of Classification Search
CPC ....................................................... C08J 9/228
See application file for complete search history.

(56) References Cited

U.S. PATENT DOCUMENTS

| | | | | |
|---|---|---|---|---|
| 6,169,124 | B1 * | 1/2001 | Horn ................... | C08G 18/0838 |
| | | | | 521/120 |
| 2002/0160204 | A1 * | 10/2002 | Partusch ............... | B29C 70/081 |
| | | | | 428/423.1 |
| 2003/0118806 | A1 * | 6/2003 | Schonebeck ........ | B29C 44/1209 |
| | | | | 442/370 |
| 2004/0256889 | A1 * | 12/2004 | Schonebeck ........... | B29C 33/16 |
| | | | | 296/187.02 |
| 2007/0151652 | A1 * | 7/2007 | Burks ................ | C08G 18/1816 |
| | | | | 264/46.4 |

FOREIGN PATENT DOCUMENTS

| | | | |
|---|---|---|---|
| KR | 10-2008-0087831 | A | 10/2008 |
| KR | 10-2009-0110436 | A | 10/2009 |
| KR | 10-2021-0122366 | A | 10/2021 |
| KR | 10-2022-0071659 | A | 5/2022 |

* cited by examiner

*Primary Examiner* — Irina Krylova

(57) ABSTRACT

A plastic composite comprises a face sheet layer, a reinforcement layer formed on an upper surface of the face sheet layer and including a first glass fiber and a polyurethane foam, and a LFI layer formed on an upper surface of the reinforcement layer and including a second glass fiber and a polyurethane foam.

4 Claims, 1 Drawing Sheet

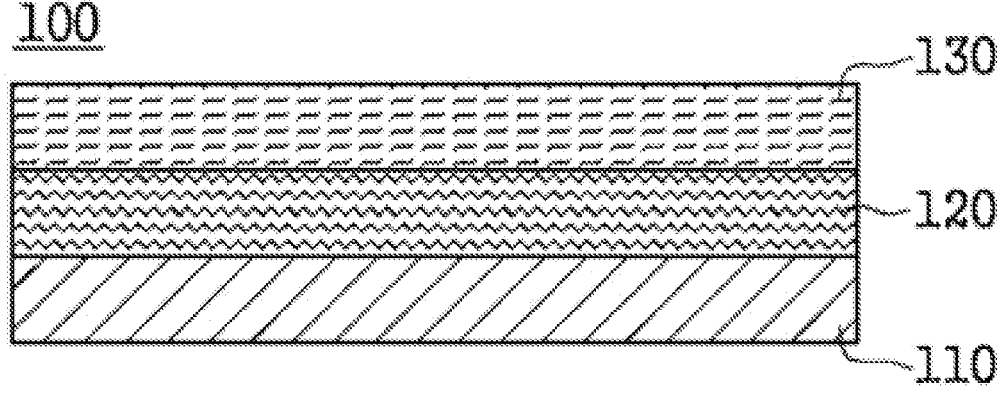
100
130
120
110

PLASTIC COMPOSITE WITH IMPROVED PHYSICAL PROPERTIES

CROSS-REFERENCE TO RELATED APPLICATION

The present application claims priority under 35 U.S.C. 119(a) to Korean Patent Application No. 10-2022-0090847, filed on Jul. 22, 2022. The entire disclosure of above patent applications is incorporated herein by reference.

TECHNICAL FIELD

The present disclosure relates to a plastic composite with improved properties

BACKGROUND ART

In a recent, lightweight of vehicle parts has been issues in the field of car industry. At a conversion time in which vehicles having internal combustion engines is changed into electric vehicles, various requirements with respect to light-weight have been additionally increased. Accordingly, fiber-reinforced composites are one of effective materials as alternative materials capable of substituting conventional metallic materials.

LFI (Long Fiber Injection) as one of a method for molding vehicles parts employing fiber-reinforced composites has an advantage in that a degree of a shape freedom is high to be applicable in various kinds of parts. However, there is a disadvantage of limited applications of materials such as fibers where maximum length thereof is under 100 mm as reinforcement materials and thermosetting resins having foam properties, so that there are many limitations to improve thermal and mechanical properties of molded prod-ucts.

In addition, when the fibers and resins are injected through a spray, there is a limitation for the fibers to be uniformly coated. As a result, property deviations occur in the same products, and the content of fibers is limitedly increased so that it is difficult to improve properties.

SUMMARY

It is therefore an object of the present disclosure to provide a plastic composite capable of eliminating property deviations in the same plastic composite by lowering a content of a glass fiber contained in a LFI layer and improving properties of the plastic composite.

It is another object of the present disclosure to provide a plastic composite capable of a content of a glass fiber contained in the LFI layer by including a glass fiber layer between a face sheet layer and a LFI layer as well as having a stiffness replaced instead of a conventional steel material.

Embodiments of the present disclosure provide a plastic composite comprising a face sheet layer, a reinforcement layer formed on an upper surface of the face sheet layer and including a first glass fiber and polyurethane foam, and a LFI layer formed on an upper surface of the reinforcement layer and including a second glass fiber and a polyurethane foam.

In some embodiments, the unit weight of the first glass fiber of the reinforcement layer is ranged from 20 to 300 gsm.

In some embodiments, the length of the second glass fiber is ranged from 5 to 150 mm.

In some embodiments, a content of polyurethane foams contained in the reinforcement layer and the LFI layer is ranged from 50 to 90 weight % as compared to a total weight thereof.

In some embodiments, the polyurethane foam of the reinforcement layer and the LFI layer includes a blowing agent.

In some embodiments, the density of the LFI layer is ranged from 0.7 to 1.5 g/cm³.

In some embodiments, the ratio of a total thickness of the reinforcement layer and the LFI layer, and the face sheet layer is 0.5~5:1.

In some embodiments, an article including the plastic composite is included, and more concretely, is an exterior material.

In some embodiments, the article manufactured by the plastic composite is an exterior material(s) for a vehicle, an agricultural machine, a construction equipment, or a golf cart.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

A more complete appreciation of the invention, and many of the attendant advantages thereof, will be readily apparent as the same becomes better understood by reference to the following detailed description when considered in conjunc-tion with the accompanying drawings in which like refer-ence symbols indicate the same or similar components, wherein FIG. 1 is a schematic view for showing a plastic com-posite according to an embodiment of the present disclosure.

DETAILED DESCRIPTION

Hereinafter, the present disclosure will be described in detail with reference to the drawings. In describing the present disclosure, detailed descriptions related to publicly known functions or configurations will be omitted in order not to obscure the gist of the present disclosure.

The present disclosure may, however, be embodied in different forms and should not be construed as limited to the embodiments set forth herein.

Various modifications to the preferred embodiments will be readily apparent to those skilled in the art and the generic principles herein may be applied to other embodiments. Thus, the present disclosure is not limited to the embodiment shown but is to be accorded the widest scope consistent with the principles and features described herein.

The present disclosure may, however, be embodied in different forms and should not be construed as limited to the embodiments set forth herein. The same reference numeral is used to refer to like elements throughout.

In the specification, terms such as "include" or "have" should be understood as designating that features, number, steps, operations, elements, parts, or combinations thereof exist and not as precluding the existence of or the possibility of adding one or more other features, numbers, steps, operations, elements, parts, or combinations thereof in advance.

FIG. 1 is a schematic view for showing a plastic com-posite according to an embodiment of the present disclosure.

Referring to FIG. 1, a plastic composite 100 according to the present disclosure comprises a plastic composite comprises a face sheet layer 110, a reinforcement layer 120 formed on an upper surface of the face sheet layer 110 and including a first glass fiber and polyurethane foam, and a LFI layer 130 formed on an upper surface of the reinforcement layer 120 and including a second glass fiber and a polyurethane foam.

The face sheet layer 110 is capable of improving weatherability, scratch resistance, chemical resistance, abrasion resistance, etc. Also, the face sheet layer 110 is a layer in which non-painting can be applied instead of a conventional body painting lines, and is formed of single materials or hybrid materials as follows.

Typical examples of single materials are ASA (Acrylic Styrene Acrylonitrile), ABS (Acrylonitrile Butadiene Styrene), PC (Polycarbonate), PMMA (Poly Methyl Methacrylate), and PC-ABS (Polycarbonate-Acrylonitrile Butadiene Styrene).

Typical examples of hybrid materials are PMMA, ASA, and ABS, ASA and ABS, PMMA and ABS, PMMA, PC and ABS, PMMA and PC, and PMMA and PCABS.

The reinforcement layer 120 is a layer capable of improving stiffness of the plastic composite 100 and includes the first glass fiber and the polyurethane foam. Also, the reinforcement layer 120 is a single layer or a multi-layered layer depending on usages.

The unit weight of the first glass fiber of the reinforcement layer 120 is ranged from 20 to 300 gsm (gram/square meter), and preferably, is ranged from 50 to 200 gsm. If the unit weight of the first glass fiber layer is under 20 gsm, the properties and distribution uniformity of the plastic composite 100 cannot be improved. If the unit weight of the first glass fiber layer exceeds 300 gsm, the mixing and bonding power of the first glass fiber layer and a polyurethane resin are reduced, so that there exists as short shot section, and the property of the plastic composite 100 can be reduced due to low wettability.

In addition, the first glass fiber is a chop fiber, a chop strand mat, woven roving, a mat, a mesh, NCF (Non-crimp fabric) or continuous strand mat, which have a length ranged from 5 to 300 mm according to a manufacturing method or a fiber type. It is preferable that the first glass fiber is a continuous fiber because the properties thereof is excellent.

The LFI layer 130 is a layer capable of improving stiffness of the plastic composite 100 and includes the second glass fiber and the polyurethane foam. Also, the LFI layer 130 is a single layer or a multi-layered layer depending on usages.

The length of the second glass fiber of the LFI layer 130 is ranged from 5 to 150 mm. If the length of the second glass fiber is under 5 mm, the second glass fiber of the plastic composite 100 cannot perform a function as a reinforcement, so that the properties thereof can be reduced. If the length of the second glass fiber layer exceeds 150 mm, the distribution uniformity of the second glass fiber is not secured, it is possible that the entire property of plastic composite 100 is not uniformed.

The LFI layer 130 is formed by injecting the second glass fiber of a roving-type through a cutting unit in a LFI facility together with the polyurethane resin to be sprayed and then foamed by heat.

The content of the polyurethane foam contained in reinforcement layer 120 and the LFI layer 130 is ranged from 50 to 90 weight % as compared to a total weight thereof, and preferably is ranged from 60 to 80 weight %. If the content of the polyurethane foam is under 50 weight %, the impregnation between the polyurethane foam and the glass fiber is reduced, so that the property of the plastic composite 100 is reduced. If the content of the polyurethane foam exceeds 90 weight %, the content of the glass fiber being a reinforcement is short, so that the property of the plastic composite 100 is degraded.

In addition, the polyurethane foam contained in the reinforcement layer 120 is formed by permeating the polyurethane foam sprayed in the LFI layer 130 in manufacturing the plastic composite 100 into the reinforcement layer 120.

The polyurethane foam included in the reinforcing layer 120 and the LFI layer 130 may be the same.

Also, the polyurethane foam includes a blowing agent, and the content of the blowing agent is general in those skilled in the art.

The density of the LFI layer 130 is ranged from 0.7 to 1.5 g/cd, and preferably, is ranged from 1.0 to 1.3 g/cd. If the density of the LFI layer 130 is under 0.7 g/cd, the thermal property of the plastic composite is degraded. If the density of the LFI layer 130 exceeds 1.5 g/cd, the content of the glass fiber becomes increased in comparison with the polyurethane foam, so that the wettability between the polyurethane foam and the glass fiber is reduced, thereby degrading the mechanical property of the plastic composite 100.

Additionally, the ratio of a total thickness of the reinforcement layer 120 and the LFI layer 130, and the face sheet layer is 0.5-5:1, and preferably, is 1-3:1. If the ratio of a total thickness of the reinforcement layer 120 and the LFI layer 130, and the face sheet layer under 0.5-5:1, the entire property of the plastic composite 100 is degraded, so that application areas is shrunken. If the ratio of a total thickness of the reinforcement layer 120 and the LFI layer 130, and the face sheet layer exceeds 5:1, a surface badness on the face sheet layer occurs, or the weight of a product is increased so that application areas is shrunken.

The plastic composite 100 according to an embodiment of the present disclosure is formed using a manufacturing apparatus including a conventional mold used in those skilled in the art in through the following steps:

1) positioning the face sheet 110 on a lower mold; 2) positioning the first glass fiber on the face sheet 110; 3) spraying a polyurethane resin including the second glass fiber and the blowing agent; 4) forming the reinforcement layer 120 and the LFI layer 130 by closing an upper mold and foaming the polyurethane at a temperature of 30° C. to 80° C. to manufacture the plastic composite 100; and 5) separating the plastic composite 100 from the mold.

At this time, the reinforcement layer 120 is formed by mixing the polyurethane containing the second glass fiber with the first glass fiber.

Another embodiment of the present disclosure is related with a article including the plastic composite according to the present disclosure. The article is an exterior material(s) for a vehicle, an agricultural machine, a construction equipment, or a golf cart, but not limited to the disclosed embodiments, and the plastic composite of the present disclosure is applicable to exterior materials of various apparatus.

Hereinafter, concrete examples in accordance with the present disclosure will be described in more detail.

Example 1

A PMMA face sheet having a thickness of 1 mm (product manufactured by Krauss-Maffei Wegmann GmbH & Co KG, KMW company) was positioned on a lower mold of an apparatus for manufacturing a plastic composite. Then, a first glass fiber being a continuous fiber was positioned on the face sheet. Raw materials of roving-type was cut by a second glass fiber having a thickness of 12.5 mm through a cutting unit in a LFI facility. After that, a polyurethane (KPX Chemical 'NIXOL KL-170') mixed with the second glass fiber and a blowing agent of 1 weight % was mixed. The polyurethane was sprayed on the glass fiber, and then an upper mold was closed and foamed at a temperature of 30° C. to 80° C. At this time, the polyurethane was cured for 5 more minutes, and a plastic composite was separated.

The density of a LFI layer of the plastic composite was ranged from 1.2 g/cd. The entire thickness of the reinforcement layer and the LFI layer was 2 mm, the entire weight of the first glass fiber was 10 weight %, and the unit weight of the first glass fiber was 100 gsm. The content of the polyurethane foam contained in the reinforcement layer and the LFI layer was 70 weight % as compared to a total weight of the reinforcement layer and the LFI layer.

Example 2

A plastic composite was manufactured in the same manner as in Example 1, except that the unit weight of the first glass fiber was changed to 20 gsm.

Example 3

A plastic composite was manufactured in the same manner as in Example 1, except that the unit weight of the first glass fiber was changed to 300 gsm.

Example 4

A plastic composite was manufactured in the same manner as in Example 1, except that the content of entire polyurethane foam was limited to 50 weight %, the density of the LFI layer is changed to 0.9 g/cd, and the reinforcement layer and the LFI layer had a thickness of 0.5 mm.

Example 5

A plastic composite was manufactured in the same manner as in Example 1, except that the content of entire polyurethane foam was limited to 50 weight %, the density of the LFI layer is changed to 1.5 g/cd, and the reinforcement layer and the LFI layer had a thickness of 5 mm.

Comparative Example

A PMMA face sheet having a thickness of 1 mm (product manufactured by Krauss-Maffei Wegmann GmbH & Co KG, KMW company) was positioned on a lower mold of an apparatus for manufacturing a plastic composite. Raw materials of roving-type was cut by a second glass fiber having a thickness of 12.5 mm through a cutting unit in a LFI facility. After that, a polyurethane mixed with the second glass fiber and a blowing agent of 1 weight % was mixed. The polyurethane was sprayed on the face sheet, and then an upper mold was closed and foamed at a temperature of 30° C. to 80° C. At this time, the polyurethane was cured for 5 more minutes, and a plastic composite was separated.

The density of a LFI layer of the plastic composite was ranged from $1.2/cm^2$. The thickness of the LFI layer was 2 mm. The content of the polyurethane foam contained in the LFI layer was 70 weight % as compared to a weight of the LFI layer.

The thickness ratio of the face sheet, the reinforcement layer, and the LFI layer, the unit weight (gsm) of the first glass fiber, the density of the LFI layer, and the weight % of the polyurethane foam of the plastic composite manufactured in the examples 1 to 5 and the comparative example were shown in table 1.

The density was measured according to ISO 1183-1 (Density Measuring Method, Section 1. Dipping Method) using a specimen having a size of 25 mm by 25 mm.

TABLE 1

| Class. | Thickness ratio of face sheet layer, and reinforcement layer and LFI layer | Unit weight (gsm) of the first glass fiber | Density (g/cm³) of LFI layer | Weight % of polyurethane foam |
|---|---|---|---|---|
| Example 1 | 1:2 | 100 | 1.2 | 70 |
| Example 2 | 1:2 | 20 | 1.2 | 70 |
| Example 3 | 1:2 | 300 | 1.2 | 70 |
| Example 4 | 1:0.5 | 100 | 0.9 | 50 |
| Example 5 | 1:5 | 100 | 1.5 | 90 |
| Comparative Example | 1:2 | — | 1.2 | 70 |

Experimental Example

The flexural strength, flexural modulus, wettability, and dispersibility of the plastic composite manufactured in the examples 1 to 5 and the comparative example were measured by the following measuring method, and results thereof were shown in the following table 2.

[Measuring Method]

The flexural strength (Mpa) and flexural modulus (GPa) were measured according to ISO 178 (Test Standard of measuring of flexibility) using a specimen having a size of 80 mm by 25 mm.

The wettability between a polyurethane resin and a glass fiber was described by imaging a fracture section of the specimen of the flexural strength and flexural modulus using SEM (Scanning Electron Microscope) and analyzing a fracture mode to evaluate a degree of wettability between the polyurethane resin and the glass fiber ("Lv 1" represents the best of all).

TABLE 2

| Class | Flexural strength | Flexural Modulus | Wettability | Dispersibility |
|---|---|---|---|---|
| Example 1 | 200 | 6.9 | Lv. 1 | Lv. 1 |
| Example 2 | 180 | 6.7 | Lv. 1 | Lv. 3 |
| Example 3 | 190 | 6.9 | Lv. 3 | Lv. 1 |
| Example 4 | 140 | 4.8 | Lv. 3 | Lv. 2 |
| Example 5 | 160 | 5.6 | Lv. 2 | Lv. 2 |
| Comparative Example | 170 | 6.3 | Lv. 2 | Lv. 3 |

As shown in the above table 2, we found that the flexural strength, flexural modulus, wettability, and dispersibility of the plastic composite manufactured in the example 1 were very excellent. Also, we found that if the plastic composite did not include the first glass fiber, the flexural strength, flexural modulus, wettability, and dispersibility of the plastic composite were degraded in comparison with the example 1.

In the meanwhile, we found that if the unit weight of the first glass fiber was 20 gsm (see example 2) and 300 gsm (see example 3), the dispersibility or wettability of the plastic composite was low as compared to example 1 in which the unit weight of the first glass fiber was 100 gsm.

In addition, we found that if the ratio of a total thickness of the face sheet layer and the reinforcement layer, and the LFI layer, and the face sheet layer is 1:0.5 (see example 4)

and 1:5 (see example 5), the flexural strength, flexural modulus, wettability, and dispersibility of the plastic composite were low as compared to example 1 in which the ratio of the total thickness of the face sheet layer and the reinforcement layer, and the LFI layer, and the face sheet layer is 1:2.

In addition, the properties of the plastic composite can be improved by including the first glass fiber layer having a specific unit weight.

Furthermore, the properties of the plastic composite can be improved by including the polyurethane foam having a specific unit weight %.

All such changes, modifications, variations and other uses and applications which do not depart from the spirit and scope of the invention are deemed to be covered by the invention which is limited only by the claims which follow.

What is claimed is:

1. A plastic composite consisting of:
a face sheet layer;
a reinforcement layer externally formed on an upper surface of the face sheet layer and including a continuous first glass fiber with a unit weight of 50 to 200 gsm, and an embedded polyurethane foam; and a long fiber injection (LFI) layer with a density of 1.0 to 1.3 g/cm³ formed externally on an upper surface of the reinforcement layer and including a short-cut second glass fiber having a length of 5 to 150 mm and a polyurethane foam,
wherein a content of the polyurethane foams contained in the reinforcement layer and the LFI layer is ranged from 60 to 80 weight % based on a total weight of the reinforcement layer and the LFI layer,
wherein a ratio of a total thickness of the reinforcement layer and the LFI layer to the face sheet layer is 1~3:1, and
wherein the plastic composite has flexural strength of 180-200 Mpa and flexural modulus of 6.7-6.9 GPa.

2. The plastic composite of claim 1, wherein the polyurethane foam of the reinforcement layer and the polyurethane foam of the LFI layer include a blowing agent.

3. An article including the plastic composite of claim 1.

4. The article of claim 3, wherein the article is an exterior material for a vehicle, an agricultural machine, a construction equipment, or a golf cart.

* * * * *